United States Patent [19]

McGurk et al.

[11] Patent Number: 5,653,478
[45] Date of Patent: Aug. 5, 1997

[54] FLEXIBLE COUPLING ASSEMBLY

[75] Inventors: David A. McGurk, Peoria; Bhaskar Mookerjee, Bloomington, both of Ill.

[73] Assignee: Caterpillar Inc., Peoria, Ill.

[21] Appl. No.: 521,160

[22] Filed: Aug. 30, 1995

[51] Int. Cl.⁶ .................. F16L 27/11; F16L 51/02
[52] U.S. Cl. .................. 285/227; 285/300; 285/368; 285/23
[58] Field of Search .................. 285/226, 227, 285/228, 229, 299, 300, 23, 368, 412

[56] References Cited

U.S. PATENT DOCUMENTS

| | | | |
|---|---|---|---|
| 1,505,121 | 8/1924 | Allport | 285/300 |
| 2,434,224 | 1/1948 | Paul | 285/226 |
| 2,936,185 | 5/1960 | Olsen et al. | 285/226 |
| 4,484,771 | 11/1984 | Schulz | 285/368 X |
| 4,854,611 | 8/1989 | Press | 285/226 X |

FOREIGN PATENT DOCUMENTS

| | | | |
|---|---|---|---|
| 983680 | 6/1951 | France | 285/368 |
| 1195033 | 11/1959 | France | 285/412 |

*Primary Examiner*—Terry Lee Melius
*Assistant Examiner*—Heather Shackelford
*Attorney, Agent, or Firm*—Alan J. Hickman

[57] ABSTRACT

The flexible coupling assembly has a liner with a radially outwardly extending flange and a bellows with a radially outwardly extending flange connected together by weld joint at a predetermined location on an end surface of the radially outwardly extending flanges. A connecting flange is movably maintained on the bellows between the outwardly extending flange of the bellows and a flexible portion of the bellows. The flexible coupling assembly is particularly suited for use in an exhaust system of a combustion engine.

11 Claims, 2 Drawing Sheets

FLEXIBLE COUPLING ASSEMBLY

TECHNICAL FIELD

This invention relates to a flexible coupling assembly having radially outwardly extending flange portions welded together and more particularly to a flexible coupling assembly wherein the radially outwardly extending flange portions are welded together at an outer end of the flanges.

BACKGROUND ART

Flexible coupling assemblies of the type suitable for use in an exhaust system of a combustion engine are utilized when flexibility in an exhaust system is required. Flexible coupling assemblies are often disposed in an exhaust system between the combustion engine and the exhaust stack and directs combustion engine exhaust gas flow from the engine to the environment. The flexibility of a flexible coupling assembly allows for a limited amount of relative movement between the combustion engine and a frame to which the exhaust system is connected. This flexibility also accommodates thermal expansion in the exhaust system, misalignment between components of the exhaust system at the juncture of connection of the flexible coupling assembly and vibration.

One flexible coupling assembly has a cylindrical liner which is tubular in construction and provides a flow path for exhaust gasses passing through the bore of the tube. The liner is disposed in the bore of a tubular cylindrical connecting portion of an elongated tubular bellows and is connected at an end of the liner to the connecting portion by welding. The connection of the liner to the bellows is within the tubular connecting portion of the bellows at a location spaced from and between opposite ends of the bellows. Because of the location within the bellows of the end of the liner, the possibility of consistently achieving a quality weld about the liner end is remote. The location of the end of the liner within the bellows limits the position of the weld rod and the angle thereof which adversely affects the depth of penetration of the weld. Further, the position of the end of the liner within the bellows affects the welders visibility. This adversely affects the consistency of location and penetration of the weld joint.

Since the depth of penetration, the consistency of location, and the consistency of penetration of the weld joint is less than that required by specification, cracks occur at the weld joint during operation of the combustion engine. Vibration and thermal expansion of the flexible coupling assembly causes cracking where penetration and consistency of a weld are less than required.

Further, the time required in attempting to satisfactorily weld the end of the liner to the bellows in such tight quarters is excessive. This results in a waste of manpower and in additional costs to manufacture the flexible coupling assembly.

The present invention is directed to overcoming one or more of the problems set forth above.

DISCLOSURE OF THE INVENTION

In one aspect of the invention, a flexible coupling assembly comprises a connecting flange, a liner and a bellows. The connecting flange has first and second spaced sides and a bore opening at the first and second sides. The liner has a tubular body portion and a flange portion connected to and extending radially outwardly from the tubular body portion. The flange portion has first and second spaced side surfaces and the tubular body portion has spaced ends and a bore opening at the spaced ends. The liner is disposed in the bore of the connecting flange. The bellows has a tubular connecting portion and a flange portion connected to and extending radially outwardly from the tubular connecting portion. The flange portion of the bellows has first and second spaced side surfaces. The tubular connecting portion of the bellows is disposed about the tubular body portion of the liner and in the bore of the connecting flange. The first side surface of the flange portion of the bellows is engageable with the second side of the connecting flange and the second side surface of the flange portion of the bellows is engaged with the first side surface of the liner. The flange portions of the bellows and liner are joined together by a weld.

Since the bellows and liner flange portions are exposed and extend radially outwardly complete welding of the flanges is achieved in an efficient manner.

Also, the exposed and radially outwardly extending bellows and liner flange portions facilitate achieving the dept of weld penetration required to provide a strong weld joint.

BEST MODE FOR CARRYING OUT THE INVENTION

Figure 1:
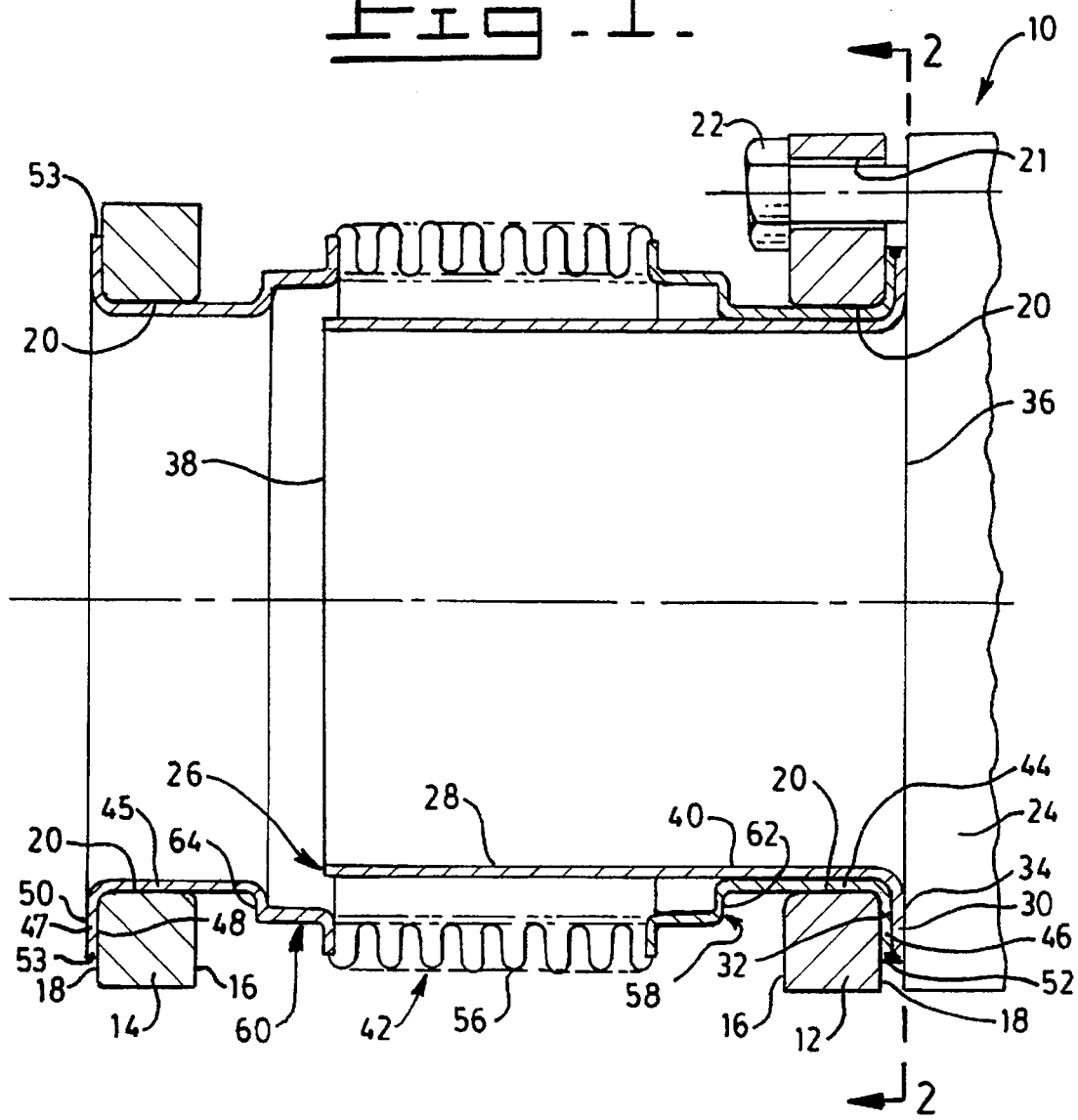
FIG. 1 is a diagrammatic cross-sectional view of an embodiment of a flexible coupling assembly of the present invention.

Referring to the drawings, a flexible coupling assembly 10 of the type used, for example, in an exhaust system of a combustion system (not shown) is provided. The flexible coupling assembly is suitable for use in marine, stationary and machine applications. The flexible coupling comprises a pair of connecting flanges 12,14 each having first and second spaced sides 16,18 and a bore 20 disposed therein and opening at said first and second sides 16,18. The flanges 12,14 each have a plurality of holes 21 (FIG. 2) disposed therethrough for receiving a plurality of fasteners 22. The connecting flanges 12,14 are suitable for connection to other flanges, such as, a supporting flange 24 of a combustion engine of similar configuration. The supporting flange 24 may contain through holes or tapped holes (not shown) with the same hole pattern as the plurality of holes 21. The fasteners 22 are disposed in the holes 21 of the connecting flanges 12,14 and into the matched holes of the supporting flange 24 or another flange of suitable well known construction. The fasteners 22 are preferably threaded and screwthreadably engaged in tapped holes of the supporting flange or a threaded nut abutting a distal side (not shown) of the supporting flange 24. The flanges 12,14,24 are made of any well known steel material capable of withstanding the range of temperatures, vibrations and exhaust byproducts associated with a combustion engine exhaust systems.

The flexible coupling assembly 10, includes a liner 26 having a tubular steel body portion 28 and a flange portion 30 connected to and extending radially outwardly from the tubular body portion 28. The flange portion 30 is preferably formed and integral with the tubular body portion 28. The flange portion 30 has first and second spaced side surfaces 32,34. The tubular body portion 28 has spaced ends 36,38 and a bore 40 disposed therethrough and opening at the spaced ends 36,38 in order to pass fluid flow, such as, exhaust gases therethrough. The liner 26 is positioned in the bore of the connecting flange 12 and directs the passing of the exhaust gasses therethrough.

The flexible coupling assembly 10, includes a steel bellows 42 having a pair of spaced apart tubular connecting portions 44,45 and a pair of spaced apart flange portions 46,47 connected to and extending radially outwardly from a respective one of said tubular connecting portions 44,45. Since the flange portions 46,47 and tubular connecting portions are identical in construction only the tubular connecting portion 44 and flange portion 46 will be discussed in detail further detail. The flange portion 46 has first and second spaced side surfaces 48,50. The tubular connecting portion 44 of the bellows 42 is disposed about the tubular body portion 28 of the liner 26 and in the bore 20 of the connecting flange 12. The first side surface 48 of the flange portion 46 is engageable with the second side 18 of the connecting flange 12 and the second side surface 50 of the flange portion 46 is engaged with the first side surface 32 of the liner 26. The flange portion 46 is preferably formed and integral with the connecting portion 44.

Figure 2:
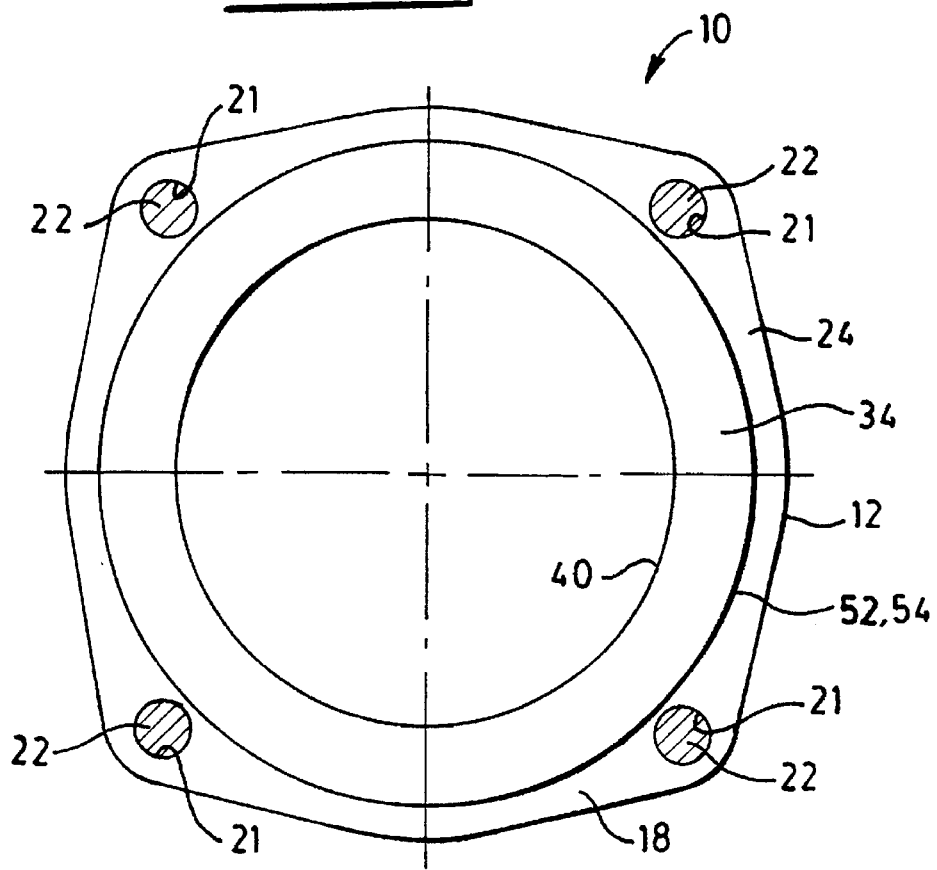
FIG. 2 is a view of the flexible coupling assembly taken along lines 2—2 of FIG. 1.
Figure 3:
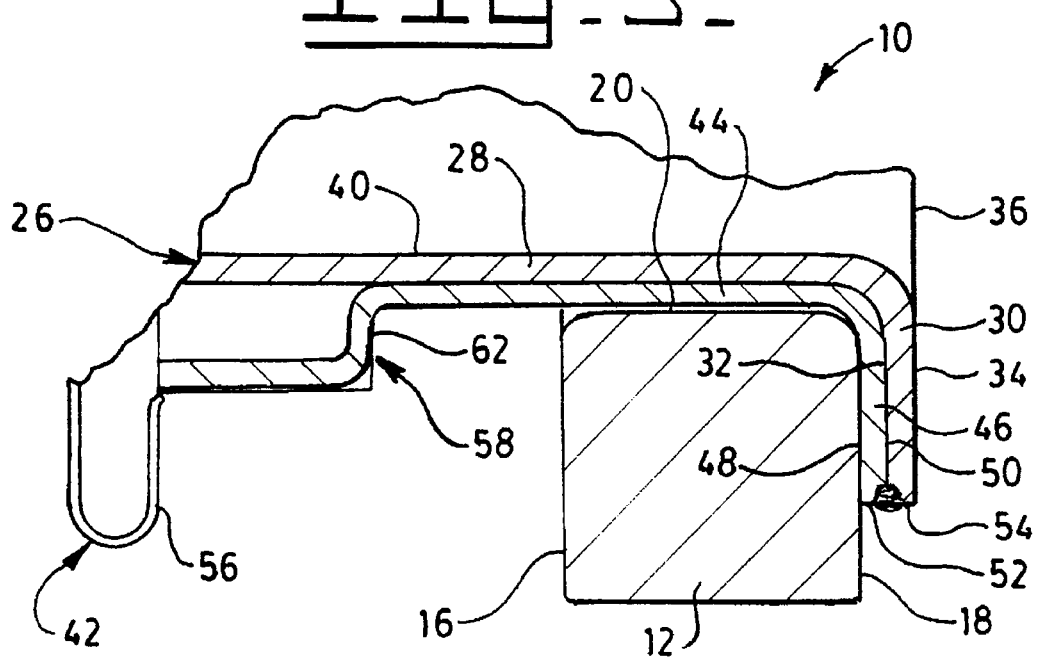
FIG. 3 is an enlarged detail of a portion of the flexible coupling assembly of FIG. 1.

The flange portions 30,46 of the bellows 42 and liner 26 are welded together by any suitable welding method. The flange portions 46,47 of the bellows 42 and the flange portion 30 of the liner 26 each have an outer end 52,53,54, respectively. Preferably, the weld connecting the liner 26 to the bellows 42 is at the outer ends 52,54. The outer ends 52,54 are preferably cylindrical in shape (as best seen in FIG. 2). Since the outer ends 52,54 are external and exposed they are easily welded together. Also, the weld is preferably disposed about the full circumference of the outer ends 52,54 so that the weld seals the passing of fluids between the flange portions 30,46 and past the outer ends 52,54 of the flange portions 30,46.

The bellows 42 has a flexible steel portion 56 circumferentially disposed about and axially overlaying at least a portion of the tubular body portion 28 of the liner 28. The flexible portion 56 is substantially sinuous in cross-section, located intermediate the pair of spaced apart tubular connecting portions 44,45 and connected to the connecting portions 44,45 in any suitable manner such as by welding, brazing, pressing and the like.

The connecting flange 12 is located between the flexible portion 56 and flange portion 46 of the bellows 42. The connecting flange 14 is located between the flexible portion 56 and the flange portion 47 of the bellows 42. The connecting flanges 12,14 are axially movable along the respective tubular connecting portions 44,45 of the bellows 42. The connecting flanges 12,14 are also rotatable about the respective tubular connecting portions 44,45 of the bellows 42. These movements promote ease of alignment and adjustability during connection of the bellows in an exhaust system.

The flexible portion 56 of the bellows 42 and the outer ends 52,53 of the flange portions 46,47 of the bellows 42 each have a preselected outer diameter. The bores 20 of the connecting flanges 12,14 also each have a preselected diameter. The preselected diameter of the bores 20 are of a magnitude less than the outer diameters of the flexible portion 56 and the outer ends 52,53 of the flange portions 46,47 of the bellows 42. Because the outer diameter of the flexible portion 56 and outer diameter of the outer ends 52,53 is larger than the diameter of the bores 20 the connecting flanges 12,14 are maintained on the respective tubular connecting portions 44,45.

A stop 58,60 may be provided on each of the tubular connecting portions 44,45 of the bellows 42. The stop 58 is axially spaced from the flange portion 46. Similarly, the stop 60 is axially spaced from the flange portion 47. The connecting flange 12 is located on the tubular connecting portion between the stop 58 and the flange portion 46 and the connecting flange 14 is located on the tubular connecting portion between the stop 60, and the flange portion 47. The flange portions 46,47 and the stops 58,60 maintain the connecting flanges on their respective tubular connecting portions 44,45 and from axial passing movement relative to the stops 58,60 and flange portions 46,47.

Preferably, the stops 58,60 are defined by step portions 62,64. The tubular connecting portion 44 includes a step portion 62 of a preselected outer diameter. The step portion 62 is axially spaced from the flange portion 46. Similarly, the tubular connecting portion 45 includes a step portion 64 of a preselected outer diameter. The step portion is axially spaced from the flange portion 47. The outer diameters of the step portions 62,64 and the diameter of the outer ends of the flange portions 46,47 of the bellows 42 is greater in magnitude than the magnitude of the diameter of the bores 20 of the connecting flanges 12,14. As discussed above this maintains the connecting flanges on the respective tubular connecting portions 44,45.

Industrial Applicability

With reference to the drawings, the flexible coupling assembly 10 of the present invention facilitates ease of connecting of the liner 26 to the bellows 42 by providing radially outward extending adjacent flange portions 30,46. The flange portions, being exposed and readily accessible, facilitates ease of welding of the flanges together at an outer end 52,54 of the flange portions. The location enables a 360 degree weld about the cylindrical outer end 52,54 of the flange portion 30,46 of the liner and bellows at the juncture of contact between the second side surface 50 of the bellows flange 46 and the first side surface 32 of the liner flange 30. Since the depth of penetration and the accuracy of positioning of the weld joint can be easily maintained about the perimeter of the outer ends 52,54, the potential for cracking due to thermal expansion, loading and vibration is reduced substantially. Thus, any potential for leaking of fluids past the outer ends of the flanges is eliminated.

The provision of the outwardly extending flange portions 30,46 also improves the strength of the of the flexible coupling assembly 10 at the location of the flange portions 30,46. Both of the flange portions 30,46 are clamped between the connecting flange 12 and the supporting flange 24 by the fasteners 22. This doubling up of flanges increases the strength and rigidity at the connecting flange 12 connection.

The connecting flanges 12,14 being slidable and rotatable on the tubular connecting portions 44,45 facilitates ease of alignment and connection of the connecting flanges 12,14 to other flanges in the exhaust system. As can be appreciated, the holes 21 must be aligned with holes in the supporting flange in order to permit connection by the fasteners 22.

The movability of the connecting flanges permits such a connection. Since the flanges 12,14 are maintained on the tubular connecting portions 44,45 the problems associated with having separate loose pieces are eliminated.

Other aspects, objects and advantages of the present invention can be obtained from a study of the drawings, the disclosure and the appended claims.

We claim:

1. A flexible coupling assembly comprising:

a connecting flange having first and second spaced sides and a bore disposed therein and opening at said first and second sides;

a liner having a tubular body portion and a flange portion, said flange portion having first and second spaced side surfaces, said tubular body portion having spaced ends and a bore disposed therethrough and opening at said spaced ends, said flange portion being connected to and extending radially outwardly from one of said ends of the tubular body; said liner being disposed in the bore of said connecting flange;

a bellows having a tubular connecting portion and a flange portion connected to and extending radially outwardly from said tubular connecting portion, said flange portion of the bellows having first and second spaced side surfaces, said tubular connecting portion of the bellows being disposed about the tubular body portion of the liner and in the bore of the connecting flange, said first side surface of the bellows flange being engageable with the second side of the connecting flange and said second side surface of the bellows flange being engageable with the first side surface of the liner flange, said flange portions of the bellows and liner being connected together by a weld joint and free from connection by welding to the connecting flange.

2. A flexible coupling assembly, as set forth in claim 1, wherein said flange portion of the bellows and liner each have an outer end, said weld connecting the liner to the bellows at the outer end of the flange portion of the bellows and liner.

3. A flexible coupling assembly, as set forth in claim 2, wherein said bellows has a flexible portion circumferentially disposed about and axially overlying at least a portion of the tubular portion of the liner.

4. A flexible coupling assembly, as set forth in claim 3, wherein said connecting flange is located between said flexible portion and the flange portion of said bellows.

5. A flexible coupling assembly, as set forth in claim 4, wherein said connecting flange is axially movable along the tubular connecting portion of said bellows.

6. A flexible coupling assembly, as set forth in claim 5, wherein said flexible portion and the outer end of the flange portion of the bellows each having a preselected outer diameter, said bore of the connecting flange having a preselected diameter, said preselected bore diameter being of a magnitude less than the outer diameters of the flexible portion and the outer end of the flange portion of the bellows.

7. A flexible coupling assembly, as set forth in claim 2, including a stop on the tubular connecting portion of said bellows spaced axially from the flange portion of said bellows, said connecting flange being located on the tubular portion between the stop and the flange portion of the bellows, said flange portion of the bellows and said stop maintaining said connecting flange on the tubular portion of said bellows between the stop and flange portions of the bellows.

8. A flexible coupling assembly, as set forth in claim 2, wherein said outer end of the flange portion of said bellows having a preselected outer diameter, said bore of the connecting flange having a preselected diameter, said tubular connecting portion of said bellows including a step portion axially spaced from the flange portion, said step portion having a preselected outer diameter, said outer diameter of the step portion and the outer end of the flange portion of said bellows being greater in magnitude than the magnitude of the diameter of said bore of the connecting flange.

9. A flexible coupling assembly, as set forth in claim 2, wherein the outer end of the flange portion of the bellows and liner are cylindrical and said weld being disposed about the cylindrical outer edges.

10. A flexible coupling assembly, as set forth in claim 2, wherein said weld joint is disposed circumferentially about the outer end of the flange portions and seals the outer end of the flange portions from passing fluids therebetween.

11. A flexible coupling assembly, as set forth in claim 2, including:

a supporting flange;

a fastening means for connecting said connecting flange to said supporting flange, said flange portion of the liner and the bellows being located between the connecting and supporting flanges.

* * * * *